Feb. 22, 1966   J. J. MARAFIOTI   3,235,943
METHOD OF MAKING A FLUX FREE BONDED ARTICLE
Filed Jan. 4, 1962
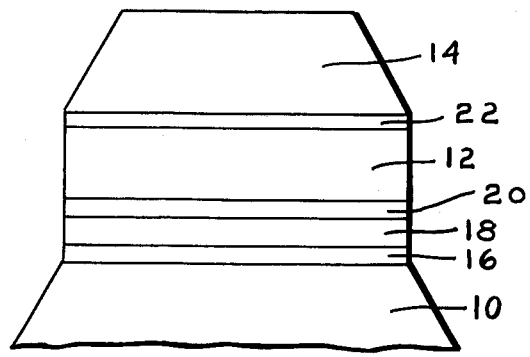
INVENTOR.
JAMES J. MARAFIOTI
BY
Clarence R. Patty, Jr.
ATTORNEY United States Patent Office 3,235,943
Patented Feb. 22, 1966

3,235,943
METHOD OF MAKING A FLUX FREE BONDED ARTICLE
James Joseph Marafioti, Bradford, Pa., assignor to Corning Glass Works, Corning, N.Y., a corporation of New York
Filed Jan. 4, 1962, Ser. No. 163,996
7 Claims. (Cl. 29—155.5)

The present invention relates to the production of assemblies embodying flux free solder bonds and more particularly to the bonding of quartz or ceramic crystals to glass delay lines but is in no way limited to such applications.

In the past, various flux free bonding methods have been employed. One such method is described in U.S. Patent No. 2,964,839 issued to J. J. Marafiioti and H. A. Scheetz and assigned to the assignee of the instant invention. It has been found, however, that heretofore known methods, although suitable for fused silica and the like delay line materials, are not suitable for glasses which are deleteriously affected by high heat metal filming processes employed in prior art methods. Examples of glasses which are deleteriously affected by high heat are alkali-lead-silicate glass, borosilicate glass and the like. Reference is made to pending application Serial No. 117,851, now Patent No. 3,173,780 by H. L. Hoover and assigned to the assignee of the instant application wherein deleterious affects of high temperature and rapid temperature changes on alkali-lead-silicate glasses is described in detail.

It is the specific object of this invention to provide an improved method for bonding quartz or ceramic crystals to delay lines.

It is another object of this invention to provide a method for producing flux free solder bonds where the mating surfaces need not be premetallized with high melting temperature alloys or metals.

It is a further object to provide a method of bonding similar or different solid materials without the need for high temperature intermediate metal filming.

Additional objects, features and advantages of the present invention will become apparent, to those skilled in the art, from the following detailed description and the attached drawing, on which, by way of example, only the preferred embodiment of this invention is illustrated.

I have found that such objects can be achieved by wetting the mating surfaces with metal, disposing a nugget of low melting temperature bonding alloy between the wetted surfaces and thereafter bonding the mating surfaces under the influence of pressure and the comparatively low temperature required for melting said bonding alloy.

The drawing is an elevation of a delay line illustrating a crystal bonded to a delay medium and an electrode therefor.

The particular delay line shown comprises a delay medium 10, of alkali-lead-silicate glass, to which is bonded a quartz crystal transducer 12, which in turn has bonded thereto a back electrode 14. The back electrode 14, can suitably be formed of tin-lead or indium-tin-lead alloys. The bonding materials between the delay medium 10 and the quartz transducer 12 comprise a film of indium 16, a layer of indium-tin-lead bonding alloy 18, and another film of indium 20.

Preparatory to making the bond between the glass and the quartz, the mating surfaces thereof are cleaned, by any suitable commercial cleaning method such as washing with detergent and water, and dried, and the glass mating surface is thereafter wetted with indium. This wetting is accomplished by heating an ultrasonic soldering iron to a temperature of about 180° C., applying indium to its soldering surface and then rubbing said soldering surface on the mating surface of the glass. The ultrasonic soldering iron causes a cavitation of the molten indium releasing any entrapped air and dirt, as well as breaking up any oxidation which would inhibit wetting of the mating surface. The indium is built up into a small puddle by the addition of indium nuggets, which puddle is thereafter allowed to solidify. Since the quartz crystal is usually thin and fragile, said ultrasonic method of wetting its mating surface is undesirable. Furthermore, wetting of the quartz crystal is preferably accomplished just prior to forming the bond so that the wetting indium does not solidify prematurely causing undesirable stresses within the crystal. It should be noted, however, that if a body is being bonded which is not fragile, its mating surface may be wetted at the same time and in the same manner as that described for the glass mating surface.

The bond between the glass and the quartz is formed as follows. The delay medium 10, having its mating surface suitably wetted, is placed in a suitable press. A nugget of bonding alloy, consisting of, for example, 98% indium, 1% tin and 1% lead, is placed on the wetted mating surface and the delay medium is heated to a temperature of about 180° C. When said bonding material has melted and formed a puddle, the surface skin thereof is removed by wiping with optical lens paper or by dragging a taut strand of silica fiber over the puddle. Concurrently with the heating of the delay medium and the melting of the bonding material, the quartz crystal transducer 12, is placed in a chuck, and held by vacuum while it is similarly heated. The crystal mating surface is then wetted, by swabbing or the like with molten indium, and a puddle is built up by adding nuggets of indium. When the indium puddle on the quartz crystal has been formed its surface skin is removed in the same manner as described for the bonding alloy.

While maintaining the temperature at about 180° C., a simultaneously skin removing operation of the respective puddles is carried out, the quartz crystal transducer 12 is immediately placed on the bonding alloy puddle and the chuck is removed. The crystal 12 is then suitably positioned and the two parts are subjected to gradually increasing pressure between the press heads, which are heated to a temperature of about 180° C., until the desired bonding pressure is reached. After the desired pressure is reached, the temperature of the press heads is reduced, to reduce the bond temperature to 135° C., during a period of approximately 10 minutes. When the press head temperature reaches 135° C., cooling thereof is discontinued and the heat input adjusted to obtain a stabilized bond temperature of 135° C. At such temperature the indium and bonding alloy solidify, completing the glass to quartz bond so that the assembly may be removed from between the press heads.

The back electrode 14, composed of a tin-lead or indium-tin-lead alloy, is then joined to the other mating surface of quartz crystal transducer 12, as follows. The quartz mating surface is wetted with a second bonding alloy having a melting temperature of less than about 130° C. consisting of, for example, 58% indium, 41% tin, and 1% lead, and a puddle thereof is formed in a manner similar to that described heretofore, except that a lower temperature of about 135° C. is employed. Concurrently with the formation of said puddle on the quartz, the back electrode 14, is preheated to about 130° C. and is also wetted by swabbing with said second bonding alloy. A puddle is not built up on the back electrode because the tin-lead or indium-tin-lead alloy of which it is composed, dissolves readily into the molten second bonding alloy.

Simultaneous removal of the surface skin of both said puddle and the wetted electrode surface are effected and immediately followed by mating of the surfaces. After the back electrode 14 has been placed on the quartz crystal, it is allowed to stabilize in temperature briefly, after which the electrode is shifted to its final desired position with respect to the quartz and the excess of molten material is brushed away from the electrode. The second bonding forms bonding layer 22. Application of heat is now discontinued and the completed assembly is permitted to gradually cool to room temperature.

If desired, the back electrode may be formed on the quartz crystal by first wetting the crystal surface and forming a puddle as hereinabove described, then adding nuggets of said second bonding alloy to the puddle, allowing them to melt, and thereafter when a height of about ⅛" is reached allowing the molten material to solidify.

It should be noted that a ceramic or quartz crystal may be premetallized by any prior art methods and thereafter bonded to glass or the like by the method of this invention.

Although the flux free bonds in the foregoing described structure are between alkali-lead-silicate glass and a quartz crystal and between a quartz crystal and a tin-lead or indium-tin-lead alloy, it is clearly evident that flux free bonding of other glasses, quartz, fused silica, ceramics, metals and the like can be readily achieved.

Although the present invention has been described with respect to specific details of certain embodiments thereof, it is not intended that such details be limitations upon the scope of the invention except insofar as set forth in the following claims.

What is claimed is:

1. In a method of producing a delay line comprising a delay medium having a crystal bonded thereto, the improvement comprising wetting the mating surface of said delay medium with molten indium, disposing a nugget of indium-base bonding alloy having a melting temperature of less than about 180° C. on said wetted delay medium mating surface, heating said delay medium and said crystal to a temperature of about 180° C. thereby melting said nugget to form a puddle, wetting the mating surface of said crystal with molten indium, removing any skin from the molten bonding alloy puddle and the molten indium on the crystal mating surface, immediately after removing such skin joining such surfaces and applying pressure to the joint so formed and while maintaining said pressure decreasing the temperature until the indium and bonding alloy solidify.

2. The method of claim 1 wherein the delay medium consists essentially of alkali-lead-silicate glass.

3. The method of claim 2 wherein the crystal is quartz.

4. The method of claim 2 wherein the crystal is ceramic.

5. The method of claim 3 wherein the bonding alloy consists essentially of indium, tin and lead.

6. In a method of producing a flux free bond between a pair of bodies one of which consists essentially of alkali-lead-silicate glass and the other body consists of material selected from the group consisting of quartz and ceramic, the improvements comprising wetting the mating surface of one of said bodies with molten indium, disposing a nugget of indium-base bonding alloy having a melting temperature of less than about 180° C. on the wetted surface of said one of said bodies, heating said bodies to a temperature of about 180° C. thereby melting said nugget to form a puddle, wetting the mating surface of the other of said bodies with molten indium, removing any skin from the molten bonding alloy puddle and the molten indium on said other of said bodies, immediately after removing such skin joining such surfaces and applying pressure to the joint so formed and while maintaining said pressure decreasing the temperature until the indium and bonding alloy solidify.

7. The method of claim 6 wherein the bonding alloy consists essentially of indium, tin and lead.

References Cited by the Examiner

UNITED STATES PATENTS

| | | | |
|---|---|---|---|
| 2,464,821 | 3/1949 | Ludwick et al. | 29—492 |
| 2,534,392 | 12/1950 | Walsh | 29—472.9 |
| 2,767,466 | 10/1956 | Faulkner | 29—472.9 |
| 2,771,048 | 11/1956 | Zimmerman | 29—503 XR |
| 2,916,810 | 12/1959 | Smith et al. | 29—195 |
| 2,964,839 | 12/1960 | Marafioti et al. | 29—504 XR |
| 2,971,251 | 2/1961 | Willemse | 29—195 |
| 3,078,564 | 2/1963 | Bourdeau | 29—498 |
| 3,082,522 | 3/1963 | Deelp | 29—155.5 XR |
| 3,109,234 | 11/1963 | Shellick et al. | 29—155.5 XR |
| 3,119,171 | 1/1964 | Anderson | 29—492 XR |

JOHN F. CAMPBELL, *Primary Examiner.*

HYLAND BIZOT, *Examiner.*